United States Patent [19]

Gilbert

[11] 4,324,676
[45] Apr. 13, 1982

[54] COMPOSITIONS CONTAINING β-DIKETO CHELATING COMPOUNDS

[75] Inventor: Herman S. Gilbert, Angleton, Tex.

[73] Assignee: The Dow Chemical Company, Midland, Mich.

[21] Appl. No.: 113,911

[22] Filed: Jan. 21, 1980

[51] Int. Cl.³ .................. C23F 11/12; C09K 5/00
[52] U.S. Cl. .................................. 252/79; 252/68; 252/73; 252/76; 422/14; 422/17; 568/412; 560/178
[58] Field of Search ............. 252/396, 68, 76, 73, 252/79; 422/14, 17; 562/231, 412; 568/374, 376, 379

[56] References Cited

U.S. PATENT DOCUMENTS 3,282,846 11/1966 Scott ............................. 252/75
3,340,001 9/1967 Thornhill ........................ 252/75
3,362,910 1/1968 Ordelt et al. ..................... 252/75
3,615,888 10/1971 Wilton ......................... 148/6.14 R Primary Examiner—Benjamin R. Padgett
Assistant Examiner—Irwin Gluck
Attorney, Agent, or Firm—B. G. Colley

[57] ABSTRACT

Aqueous glycol compositions containing conventional corrosion inhibitors are improved by the addition of a β-dicarbonyl compounds having the formula $$R_1\text{-C(O)-C}(R_2)(R_3)\text{-C(O)-}R^4$$

where
R$_1$ and R$_4$ are independently alkyl groups of 1-4 carbons, and alkoxy groups, of 1-4 carbons,
R$_2$ and R$_3$ are hydrogen, hydroxyl, alkyl groups of 1-4 carbons, or acetyl groups, with the proviso that R$_1$ and R$_2$ can be joined to form a 5 or 6 membered ring when R$_3$ is hydrogen and R$_4$ is an alkyl group of 1-4 carbons,
with the proviso that R$_1$ and R$_4$ can be joined to form a 5 membered ring when R$_2$ is hydrogen and R$_3$ is an alkyl group of 1-4 carbons, with the proviso that R$_1$ and R$_4$ can be joined to form the 1,2-phenylene group when R$_2$ and R$_3$ are hydrogen, and
with the proviso that R$_1$ and R$_4$ can be joined to form the 1,2 phenylene group when R$_2$ is hydroxyl and R$_3$ is the 2-hydroxy 1,3-dione-indanyl-2 group.

8 Claims, No Drawings

COMPOSITIONS CONTAINING β-DIKETO CHELATING COMPOUNDS

BACKGROUND OF THE INVENTION

The present invention provides corrosion resistant glycol compositions.

Compositions containing glycols and various corrosion inhibitors are well known in the prior art as is illustrated by U.S. Pat. Nos. 3,282,846, dated Nov. 1, 1966; 3,362,910, dated Jan. 9, 1968 and 3,340,001, dated Sept. 5, 1967. The use of the relatively inexpensive and effective borax and silicates in formulations is well illustrated by these patents. It is conventional in this art to make an aqueous organic concentrate which is then sold to end users for use as a coolant in internal combustion engines fitted with radiators and other heat exchangers. The concentrate is normally used after dilution with water.

The use of acetylacetone is known as a corrosion inhibitor for aluminum in hydrochloric acid solutions (Desai et al; J. Indian Chem. Soc., Vol 73, Series 50, pages 341-343).

In an investigation of 68 potential corrosion inhibitors for aluminum in glycol-water systems Northan et al. (Proceed. of 24th Conference, Nat'l. Ass'n. of Corrosion Engineers, 1969) (Chem Abstracts 72:5730j) did not suggest the use of β-diketo compounds.

U.S. Pat. No. 3,615,888 dated Oct. 26, 1971 discloses the use of β-diketones to coat bare metals prior to the painting thereof. There is no suggestion in the patent of the compositions of this invention.

SUMMARY OF THE INVENTION

It has now been discovered that the corrosion performance of single phase glycol-water compositions containing the usual inhibitors can be improved by the addition of an effective amount of one or more soluble β-dicarbonyl compounds having the general formula $$R_1-C(O)-C(R_2)(R_3)-C(O)-R_4$$

where
$R_1$ and $R_4$ are independently alkyl groups of 1–4 carbons, and alkoxy groups, of 1–4 carbons,
$R_2$ and $R_3$ are hydrogen, hydroxyl, alkyl groups of 1–4 carbons, or acetyl groups, with the proviso that $R_1$ and $R_2$ can be joined to form a 5 or 6 membered ring when $R_3$ is hydrogen and $R_4$ is an alkyl group of 1–4 carbons,
with the proviso that $R_1$ and $R_4$ can be joined to form a 5 membered ring when $R_2$ is hydrogen and $R_3$ is an alkyl group of 1–4 carbons,
with the proviso that $R_1$ and $R_4$ can be joined to form the 1,2-phenylene group when $R_2$ and $R_3$ are hydrogen, and with the proviso that $R_1$ and $R_4$ can be joined to form the 1,2 phenylene group when $R_2$ is hydroxyl and $R_3$ is the 2-hydroxy 1,3-dioneindanyl-2 group.

The corrosion inhibitors of this invention are effective in the presence of the other well-known corrosion inhibitors generally present in such compositions such as alkali metal silicates, borates, mercaptobenzotriazoles, nitrates, nitrites, phosphates, benzoates and the like.

The present invention is a composition comprising
(A) 25 to 98 percent by weight of an alkylene glycol or mixtures of alkylene glycols,
(B) a soluble amount effective to reduce metal corrosion of compounds having the formula $$R_1-C(O)-C(R_2)(R_3)-C(O)-R_4$$

where
$R_1$ and $R_4$ are independently alkyl groups of 1–4 carbons, and alkoxy groups, of 1–4 carbons,
$R_2$ and $R_3$ are hydrogen, hydroxyl, alkyl groups of 1–4 carbons, or acetyl groups, with the proviso that $R_1$ and $R_2$ can be joined to form a 5 or 6 membered ring when $R_3$ is hydrogen and $R_4$ is an alkyl group of 1–4 carbons,
with the proviso that $R_1$ and $R_4$ can be joined to form a 5 membered ring when $R_2$ is hydrogen and $R_3$ is an alkyl group of 1–4 carbons, with the proviso that $R_1$ and $R_4$ can be joined to form the 1,2-phenylene group when $R_2$ and $R_3$ are hydrogen, and with the proviso that $R_1$ and $R_4$ can be joined to form the 1,2 phenylene group when $R_2$ is hydroxyl and $R_3$ is the 2-hydroxy 1,3-dione-indanyl-2 group.

DETAILED DESCRIPTION OF THE INVENTION

The glycols which can be used in the present invention are ethylene glycol, diethylene glycol, triethylene glycol, propylene glycol and mixtures thereof.

When diluted with water to a range from about 25 to 75 weight percent glycol, the above glycols are well known antifreeze coolant compositions. They are commonly sold as an aqueous concentrate containing 85 to 98 weight percent glycol. The present invention thus encompasses the dilute and concentrated glycol solutions, i.e. 25 to 98%.

The following are examples of known and conventional corrosion inhibitors which can be used in the present invention.

Alkali metal silicates such as sodium metasilicate, potassium metasilicate, lithium metasilicate, and the like.

Alkali metal borates such as sodium tetraborate, potassium tetraborate, sodium metaborate, and potassium metaborate.

Alkali metal mercaptobenzotriazoles, and alkali metal tolyltriazoles.

Alkali metal nitrates such as sodium nitrate, potassium nitrate, and alkali metal nitrites such as potassium and sodium nitrite.

Alkali metal hydroxides such as sodium hydroxide, potassium hydroxide, and lithium hydroxide.

Alkali metal phosphates such as sodium phosphate and potassium phosphate.

Alkali metal benzoates such as sodium benzoate and potassium benzoate.

Examples of β-dicarbonyl compounds that are sufficiently soluble in the glycol-water compositions to be useful in this invention are acetylacetone (2,4-pentanedione), ethyl acetoacetate, triacetylmethane, 2-methyl-1,3-cyclopentanedione, 1,3-indandione, 2-acetylcyclohexanone, 2-acetylcyclopentanone, hydrindantin, 2,4-nonanedione, 2,4-octanedione, butyl acetoacetate, propyl acetoacetate, 2-propyl-1,3-cyclopentanedione, 4-methyl-1,3-indandione, 2-propionylcyclohexanone, 2-propionylcyclopentanone, and mixtures thereof.

Surprisingly, it has been found that closely related β-dicarbonyl compounds such as acetonylacetone, dibenzoylmethane, 1,4-cyclohexanedione, 1,3- cyclohexanedione, and 1,3-cyclopentanedione did not effectively inhibit corrosion.

In a typical process of making the compositions of this invention, one or more of the above glycols are mixed with one of the above borates and dissolved in water and sufficient amounts of mercaptobenzothiazoles, tolytriazoles, nitrates, and/or phosphate inhibitors necessary for corrosion reduction are added. An effective amount of the above $\beta$-dicarbonyl compound can be then added. The pH of the solution is adjusted to a pH range of about 7–12, and preferably 9–11, by adding a basic inorganic compound such as an alkali metal hydroxide, carbonate, or phosphate. One of the above alkali metal silicates can be added to produce an effective coolant composition.

The use of the above conventional corrosion inhibitors when used in a corrosion inhibiting amount is well known to those skilled in the art. Of course, this amount will vary for each inhibitor.

For the purposes of this invention, an effective amount of the $\beta$-dicarbonyl compound which will give an improved composition is an amount ranging from about 0.01 to about 1.0 percent by weight based on the total weight of the composition and preferably in the range from 0.05 to 0.3 percent by weight.

The invention is further illustrated but not limited by the following examples and controls:

EXAMPLE 1

A sample of a commercial antifreeze concentrate (hereinafter control A) was tested by the hot aluminum test. In this test 70 ml. of the concentrate was mixed with 140 ml. of water having a standard hardness, (i.e. ASTM water which has 100 ppm each of chloride, sulfate, and bicarbonate ions). An aluminum specimen 1-$\frac{1}{2}''$ dia. $\times \frac{3}{4}''$ was exposed to this solution and heated under a nitrogen pad at 125° C. for 168 hours (one week). Under these conditions, it was found that the specimen lost 17 milligrams of weight.

Under identical conditions, the test was repeated using control A plus 1000 parts per million (ppm) acetylacetone. The specimen lost 6 milligrams of weight and visual inspection indicated that the surface was signigicantly improved, i.e. less pitting and less discoloration as compared to the original formulation without the acetylacetone.

EXAMPLE 2

Ethyl acetoacetate (886 ppm) was added to the Control A solution. One part of the solution was diluted with 2 parts of ASTM water and was tested on the hot aluminum test equipment. The aluminum weight loss was reduced from 17 mg (Control A) to 1.7 mg.

EXAMPLE 3

Acetylacetone (1329 ppm) was added to the Control A solution. This solution was diluted as in Example 2 and was tested on the hot aluminum test equipment. The aluminum weight loss was reduced from 17 mg to 2.9 mg when compared to Control A.

EXAMPLE 4

Triacetylmethane (1000 ppm) in Control A solution was evaluated on the hot aluminum test equipment as in Example 2. Aluminum weight loss was reduced from 17 mg to 2.3 mg.

EXAMPLE 5

2-methyl-1,3-cyclopentanedione (1000 ppm) in Control A solution was evaluated on the hot aluminum test equipment as in Example 2. Aluminum weight loss was reduced from 17 mg to 5.7 mg.

EXAMPLE 6

Hydrindantin (1000 ppm) in Control A solution was evaluated on the hot aluminum test equipment as in Example 2. Aluminum weight loss was reduced from 17 mg to 4.8 mg. Hydrindantin is also known as 2,2-biindan-1,1,3,3-tetrone-2,2-dihydroxy (C.A. 64:12611E).

EXAMPLE 7

1,3-indandione (1000 ppm) in Control A solution was evaluated on the hot aluminum test equipment as in Example 2. Aluminum weight loss was reduced from 17 mg to 4.8 mg.

EXAMPLE 8

2-acetylcyclohexanone (1000 ppm) in Control A solution was evaluated on the hot aluminum test equipment as in Example 2. Aluminum weight loss was reduced from 17 mg to 4.8 mg.

EXAMPLE 9

2-acetylcyclopentanone (1000 ppm) in Control A solution was evaluated on the hot aluminum test equipment as in Example 2. Aluminum weight loss was reduced from 17 mg to 0.6 mg.

There was significantly improved surface appearance in all the above Examples over the control.

EXAMPLE 10

Specimens of metals shown below in Table I typical of those present in automotive cooling systems were totally immersed in the test coolant solution which consisting of a 33 $\frac{1}{3}$% solution of Control A in ASTM water with aeration for 336 hours at 190° F. The corrosion-inhibitive properties of the test solutions with and without acetylacetone are evaluated on the basis of the weight changes incurred by the specimens.

TABLE I

| ASTM GLASSWARE CORROSION DATA (D-1384) | | | | | | |
|---|---|---|---|---|---|---|
| | Weight Loss (mg/specimen) (Average of 3) | | | | | |
| Antifreeze | Copper | Solder | Brass | Steel | Cast Iron | Aluminum |
| Control A Solution | 2.4 | 3.4 | 3.1 | 0.7 | 3.1 | +1.1 |
| Control A Solution + 1000 ppm acetylacetone | 0.9 | 2.3 | 1.4 | 0.3 | 0.4 | 0.0 |
| Average weight loss: | for all coupons | | | all coupons except Aluminum | | |
| Control A | 2.0 mg | | | 2.6 mg | | |
| Control A + 1000 ppm acetylacetone | 0.7 mg | | | 1.7 mg | | |

Control A with acetylacetone gave 65% less weight loss than Control A when the combined weight losses of all six coupons were considered.

Control A with acetylacetone gave 35% less weight loss than Control A when the combined weight losses of all coupons except aluminum were considered.

EXAMPLES 11-16

Specimens of metals shown in Table II were totally immersed in the test coolant solution with aeration for 336 hours (14 days) at 190° F. The corrosion-inhibitive properties of the test solutions are evaluated on the basis of the weight changes incurred by the specimens. The various corrosion inhibitors of this invention are added to the Control A solution at 1000 parts per million (ppm).

TABLE II

ASTM GLASSWARE CORROSION DATA (D-1384)

| Antifreeze | Weight Loss (mg/specimen) | | | | |
|---|---|---|---|---|---|
| | Copper | Solder | Brass | Steel | Cast Iron |
| Control A Solution | 2.4 | 4.9 | 1.9 | 1.9 | 6.0 |
| Example 11 triacetylmethane | 1.6 | 8.0 | 3.1 | 3.3 | 6.2 |
| Example 12 2-methyl 2,3-cyclopentane dione | 1.7 | 7.1 | 2.5 | 0.9 | 6.5 |
| Example 13 hydrindantin | 1.6 | 3.0 | 1.6 | 2.1 | 4.6 |
| Example 14 indandione | 1.6 | 3.4 | 2.3 | 1.2 | 4.1 |
| Example 15 2-acetyl cyclohexanone | 1.7 | 3.6 | 2.2 | 1.8 | 3.9 |
| Example 16 2-acetyl pentanone | 2.0 | 4.2 | 2.0 | 1.2 | 4.5 |
| ASTM allowable weight loss | 10 | 30 | 10 | 10 | 10 |

The data in Table II supports the conclusion that in general the examples are superior to the control solution for most of the usual metal alloys or metals found in an automotive cooling system and within the ASTM allowable weight loss. With respect to solder, brass and cast iron, examples 11 and 12 are not superior. However, these corrosion inhibitors are superior in regard to aluminum as is shown by examples 4 and 5. Other deviations in Table II are to be considered in the light of the superior aluminum performance.

I claim:

1. An aqueous corrosion resistant glycol composition comprising
    (A) 25 to 98 percent by weight of an alkylene glycol or mixtures of alkylene glycols,
    (B) a soluble amount effective to reduce metal corrosion of β-dicarbonyl compounds having the formula $R_1-C(O)-C(R_2)(R_3)-C(O)-R_4$ where
    $R_1$ and $R_4$ are independently alkyl groups of 1-4 carbons, and alkoxy groups, of 1-4 carbons,
    $R_2$ and $R_3$ are hydrogen, hydroxyl, alkyl groups of 1-4 carbons, or acetyl groups, with the proviso that $R_1$ and $R_2$ can be joined to form a 5 or 6 membered ring when $R_3$ is hydrogen and $R_4$ is an alkyl group of 1-4 carbons,
    with the proviso that $R_1$ and $R_4$ can be joined to form a 5 membered ring when $R_2$ is hydrogen and $R_3$ is an alkyl group of 1-4 carbons,
    with the proviso that $R_1$ and $R_4$ can be joined to form the 1,2-phenylene group when $R_2$ and $R_3$ are hydrogen, and with the proviso that $R_1$ and $R_4$ can be joined to form the 1,2 phenylene group when $R_2$ is hydroxyl and $R_3$ is the 2-hydroxy 1,3-dione-indanyl-2 group.

2. The composition as set forth in claim 1 wherein the amount of β-dicarbonyl compound used is about 0.01 to about 1.0 percent by weight based on the total weight of said composition.

3. The composition as set forth in claim 1 wherein the amount of β-dicarbonyl compound used is about 0.05 to about 0.3 percent by weight based on the total weight of said composition.

4. The composition as set forth in claim 1 wherein the amount of alkylene glycol ranges from 85 to 98 percent alkylene glycol.

5. The composition as set forth in claim 1 wherein the β-dicarbonyl compound is selected from the group consisting of acetylacetone, ethyl acetoacetate, triacetylmethane, 2-methyl-1,3-cyclopentanedione, 1,3-indandione, 2-acetylcyclohexanone, 2-acetylcyclopentanone, hydrindantin, and mixtures thereof.

6. The composition as set forth in claim 5 wherein the β-dicarbonyl compound is acetylacetone.

7. The composition as set forth in claim 1 wherein the metals which are inhibited are selected from the group consisting of aluminum, copper, solder, brass, steel and cast iron.

8. The composition of claim 7 wherein the metal is aluminum.

* * * * *